US010277095B2

(12) United States Patent
Perry

(10) Patent No.: US 10,277,095 B2
(45) Date of Patent: Apr. 30, 2019

(54) COOLING ARRANGEMENT USING AN ELECTROCHEMICAL CELL

(75) Inventor: Michael L. Perry, Glastonbury, CT (US)

(73) Assignee: AUDI AG, Ingolstadt (DE)

(*) Notice: Subject to any disclaimer, the term of this patent is extended or adjusted under 35 U.S.C. 154(b) by 93 days.

(21) Appl. No.: 13/991,789

(22) PCT Filed: Dec. 27, 2010

(86) PCT No.: PCT/US2010/062132
§ 371 (c)(1),
(2), (4) Date: Jun. 5, 2013

(87) PCT Pub. No.: WO2012/091692
PCT Pub. Date: Jul. 5, 2012

(65) Prior Publication Data
US 2013/0257199 A1 Oct. 3, 2013

(51) Int. Cl.
H02K 9/10 (2006.01)
B01D 53/32 (2006.01)
C25B 15/00 (2006.01)

(52) U.S. Cl.
CPC ............ H02K 9/10 (2013.01); B01D 53/326 (2013.01); C25B 15/00 (2013.01); B01D 2256/16 (2013.01)

(58) Field of Classification Search
CPC ... C25B 1/02–1/12; C25B 15/00; H02K 9/10; B01D 53/326; B01D 2256/16
See application file for complete search history.

(56) References Cited

U.S. PATENT DOCUMENTS

| 6,024,848 | A | 2/2000 | Dufner et al. |
| 6,126,726 | A | 10/2000 | Foley, Jr. et al. |
| 6,146,780 | A * | 11/2000 | Cisar ............ C25B 9/04 429/435 |
| 6,167,721 | B1 | 1/2001 | Tsenter |
| 6,326,709 | B1 | 12/2001 | Adelmann et al. |
| 6,424,062 | B1 | 7/2002 | Adelmann et al. |
| 7,438,986 | B2 | 10/2008 | Shimotori et al. |
| 2003/0196893 | A1 * | 10/2003 | McElroy ......... C25B 1/02 204/266 |
| 2004/0202914 | A1 * | 10/2004 | Sridhar et al. ............ 429/34 |

(Continued)

FOREIGN PATENT DOCUMENTS

| EP | 0 389 263 A1 | 9/1990 |
| JP | 2-279501 A | 11/1990 |

(Continued)

OTHER PUBLICATIONS

International Preliminary Report on Patentability for International Application No. PCT/US2010/062132 dated Jul. 11, 2013.

(Continued)

Primary Examiner — Ciel P Thomas
(74) Attorney, Agent, or Firm — Seed IP Law Group LLP

(57) ABSTRACT

An example generator cooling arrangement includes an electrochemical hydrogen pump configured to receive and adjust a fluid containing hydrogen and to provide a refined supply of hydrogen. An electric power generator receives the supply of hydrogen. The refined supply of hydrogen is used to remove thermal energy from the electric power generator.

11 Claims, 2 Drawing Sheets

(56) References Cited

U.S. PATENT DOCUMENTS

| | | | |
|---|---|---|---|
| 2007/0000789 A1* | 1/2007 | Libby | C25B 1/04 |
| | | | 205/637 |
| 2007/0243624 A1* | 10/2007 | Speranza | G01N 33/005 |
| | | | 436/144 |
| 2010/0071889 A1* | 3/2010 | Radl | G05D 16/2013 |
| | | | 165/286 |
| 2010/0213052 A1* | 8/2010 | McAlister | 204/261 |
| 2010/0266923 A1 | 10/2010 | McElroy et al. | |

FOREIGN PATENT DOCUMENTS

| | | |
|---|---|---|
| JP | 9-40401 A | 2/1997 |
| JP | 10-2004-0059134 A | 10/2001 |
| JP | 2001-518778 A | 10/2001 |
| JP | 2004032845 | 1/2004 |
| JP | 0576154 | 11/2012 |
| RU | 2 253 936 C2 | 6/2005 |
| WO | 99/17429 A1 | 4/1990 |
| WO | 2006/031871 A1 | 3/2006 |
| WO | 2008/019300 A2 | 2/2008 |
| WO | 2012091692 | 7/2012 |

OTHER PUBLICATIONS

International Search Report and Written Opinion for PCT/US2010/062132 dated Sep. 19, 2011.
Extended European Search Report, dated Nov. 18, 2014, for European Application No. 10861278.9-1351 / 2659574, 7 pages.
European Examination Report for Application No. 10 861 278.9 dated Aug. 21, 2018.

* cited by examiner

COOLING ARRANGEMENT USING AN ELECTROCHEMICAL CELL

TECHNICAL FIELD

This disclosure relates to an electrochemical cell and, more particularly, to using an electrochemical cell to adjust a flow of hydrogen used as a coolant.

BACKGROUND

Hydrogen is commonly used as a cooling fluid. Some electrical power generators communicate hydrogen through their windings to remove thermal energy from the generator. Hydrogen is particularly useful for this application due to its high heat capacity and relatively low density. Using hydrogen as a cooling fluid is particularly prevalent in large generators, such as generators configured to provide more than 150 megawatts of power.

Some devices that utilize hydrogen as a cooling fluid receive the hydrogen directly from a stored hydrogen supply, such a storage tank. The stored hydrogen supply must be periodically refilled, which is costly and inefficient. The stored hydrogen onsite is also a safety concern. The flow of hydrogen from the stored hydrogen supply can also carry moisture into the generator, particularly when the hydrogen supply is not optimized to meet the demand for hydrogen. The moisture can crack retaining rings and other components in the generator. Some electrical power generators receive a flow of hydrogen directly from an electrolyzer rather than a hydrogen supply. The electrolyzer produces hydrogen as needed. As known, electrolyzers are costly and require significant capital cost to implement. For all of these reasons, it is desirable to reduce the amount of hydrogen required while still supplying hydrogen having an appropriate pressure, temperature, and purity to efficiently cool the electric power generator.

SUMMARY

An example generator cooling arrangement includes an electrochemical hydrogen pump configured to receive and adjust a fluid containing hydrogen and to provide a refined supply of hydrogen. An electric power generator receives the supply of hydrogen. The refined supply of hydrogen is used to remove thermal energy from the electric power generator.

An example electrochemical hydrogen pump is configured to receive a fluid containing hydrogen and to provide a refined supply of hydrogen cooling fluid that is used to remove thermal energy from a device.

An example electric power generator cooling method includes providing a refined supply of hydrogen using an electrochemical cell and communicating the refined supply of hydrogen to an electric power generator. The method removes thermal energy from the electric power generator using the refined supply of hydrogen.

These and other features of the disclosed examples can be best understood from the following specification and drawings, the following of which is a brief description.

DETAILED DESCRIPTION

Figure 1:
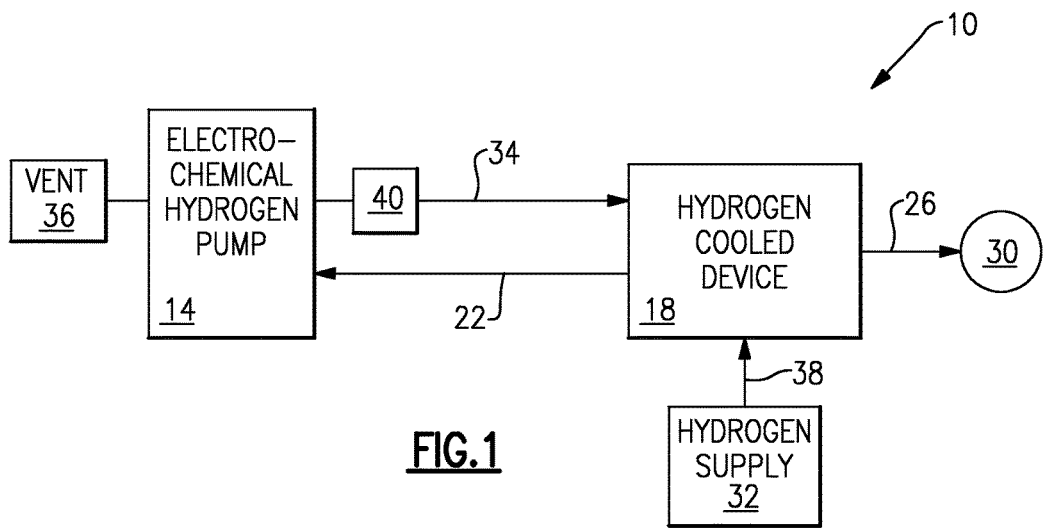
FIG. 1 shows a highly schematic view of an example cooling arrangement that includes an electrochemical hydrogen pump.

Referring to FIG. 1, an example cooling arrangement 10 includes an electrochemical hydrogen pump 14 and a hydrogen cooled device 18. A fluid communicates from the hydrogen cooled device 18 along a path 22 to the electrochemical hydrogen pump 14. The electrochemical hydrogen pump 14 provides a refined supply of hydrogen to the hydrogen cooled device 18 along a path 34. The refined supply of hydrogen provided along the path 34 comprises the hydrogen purified within the electrochemical hydrogen pump 14.

After moving through the path 34, the refined supply of hydrogen moves through the hydrogen cooled device 18. In this example, the refined supply of hydrogen moves thermal energy away from the hydrogen cooled device 18 along a path 26. The thermal energy is exhausted to the surrounding environment at 30. Alternatively, thermal energy moves away from the hydrogen cooled device 18 carried by the fluid moving along the path 22.

In this example, the electrochemical hydrogen pump 14 purifies hydrogen from the fluid received from the path 22 to provide the refined supply of hydrogen. When purifying hydrogen from the fluid received from the path 22, the electrochemical hydrogen pump 14 recycles hydrogen that has already moved through the hydrogen cooled device 18. That is, the electrochemical hydrogen pump 14 purifies hydrogen in the fluid and communicates it back to the hydrogen cooled device 18 along the path 34. The impurities present in the fluid from path 22 along with some hydrogen, are vented from the electrochemical hydrogen pump 14 through a vent 36.

In addition to purifying hydrogen from the fluid, the example electrochemical hydrogen pump 14 is also configured to regulate the pressure of the supply of hydrogen provided to the hydrogen cooled device 18 along the path 34. The example path 34 passes through a pressure regulator device 40, which typically consists of a control valve and a pressure gauge in a single device. The electrochemical hydrogen pump 14 evolves hydrogen at almost any pressure desired. It takes more electric power to generate higher pressures. In one example, a device (not shown) provides the desired back pressure on the electrochemical hydrogen pump 40, which includes cells designed to operate at the desired pressure, to result in the pressure desired.

Purifying hydrogen from the fluid and regulating the pressure are examples of how the example electrochemical hydrogen pump 14 refines the fluid. In another example, the electrochemical hydrogen pump 14 controls the temperature of the refined fluid.

The example hydrogen cooled device 18 is also configured to selectively receive hydrogen directly from a hydrogen supply 32. When needed, the hydrogen communicates from the hydrogen supply 32 to the hydrogen cooled device 18 along a path 38. The hydrogen cooled device 18 receives hydrogen from the hydrogen supply 32 if the electrochemical hydrogen pump 14 is not able to provide sufficient hydrogen to the hydrogen cooled device 18 (e.g., during system start-up). The example electrochemical hydrogen pump 14 is only able to provide sufficient hydrogen to the hydrogen cooled device 18 if there is sufficient hydrogen in the fluid moving along the path 22. Due to leaks in the hydrogen-coolant loop and venting from the electrochemical hydrogen pump 14 some make-up hydrogen will be periodically required, which is provided by the hydrogen supply 32.

Figure 2:
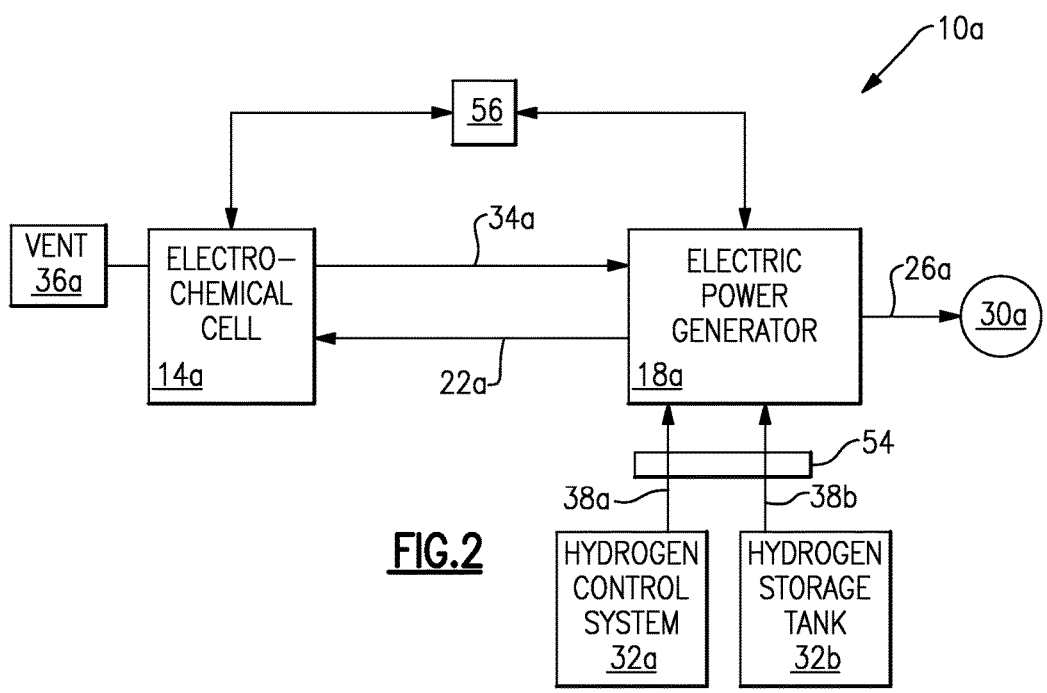
FIG. 2 shows a schematic view of an example generator cooling arrangement that includes an electrochemical cell.

Referring to FIG. 2 with continuing reference to FIG. 1, in one example, the electrochemical hydrogen pump 14 of a cooling arrangement 10*a* includes an electrochemical cell 14*a* that includes an electrolyte, such as a polymer electrolyte membrane that can selectively transport hydrogen ions, or protons. The electrochemical cell 14*a* is configured to purify hydrogen from the fluid provided to the electrochemical cell 14*a* along a path 22*a*. The electrochemical cell 14*a* then communicates the refined hydrogen purified from the flow of fluid along a path 34*a* to an electric power generator 18*a*, which is a type of hydrogen cooled device 18. Impurities are vented from the electromechanical cell 14*a* at vent 36*a*.

Within the electric power generator 18*a*, the refined hydrogen absorbs thermal energy, particularly from windings of the electric power generator 18*a*. A person having skill in this art and the benefit of this disclosure would understand how to utilize a flow of hydrogen to remove thermal energy from the electric power generator 18*a*.

Hydrogen that has moved through the electric power generator 18*a* communicates from the electric power generator 18*a* back to the electrochemical cell 14*a* along a path 22*a*. As can be appreciated, the fluid communicating along the path 22*a* includes hydrogen as well as impurities and other elements that are picked up from the electric power generator 18*a*, for example, or components of air that diffuse into the hydrogen system.

Thermal energy is communicated away from the electric power generator 18*a* along the path 26*a* and is exhausted to the surrounding environment at 30*a*. Thermal energy is also carried away from the electric power generator 18*a* in the fluid communicating along the path 22*a*.

The example cooling arrangement 10*a* includes a hydrogen control system 32*a*, such as a Proton Energy Stableflow® system, and a hydrogen storage tank 32*b*. The hydrogen control system 32*a* and the hydrogen storage tank 32*b* are examples of the hydrogen supply 32 in FIG. 1.

The hydrogen control system 32*a* and the hydrogen storage tank 32*b* provide hydrogen directly to the electric power generator 18*a* along the path 38*a* and the path 38*b*, respectively. In this example, a valve 54 selectively communicates a supply of hydrogen from the hydrogen storage device 32*b* when the electric power generator 18*a* needs additional hydrogen. The hydrogen control system 32*a* monitors the properties of the hydrogen fluid in the electric power generator 18*a*; these properties may include: purity, temperature, and pressure. The hydrogen control system 32*a* controls the valve 54. In this manner, the hydrogen control system 32*a* and the hydrogen storage tank 32*b* selectively provide hydrogen to the electric power generator if the electrochemical cell 14*a* is not able to provide sufficient hydrogen, for example.

Various devices may be used as the hydrogen storage device 32*b*. For example, a supply of hydrogen may be stored in high pressure cylinders or a low pressure tank. Both such devices would function as the hydrogen storage device 32*b*. Alternatively, the hydrogen supply can consist of an electrolyzer that generates hydrogen on site from water or both an electrolyzer and hydrogen tanks.

In one example, a controller 56 monitors the purity of the hydrogen within the electric power generator 18*a*, such as the purity of hydrogen within a casing of the electric power generator. The controller 56 also monitors the pressure of the hydrogen within the electric power generator 18*a*. The controller 56 is in communication with the electrochemical cell 14*a* and is configured to adjust the hydrogen moving away from the electrochemical cell 14*a* depending on the purity and the pressure of hydrogen within the electric power generator 18*a*. The controller 56 can be part of the hydrogen control system 32*a*. Adjustments may include providing more fluid to the electrochemical cell 14*a*, increasing the rate and/or pressure of the hydrogen generated by the electrochemical cell 14*a*, and/or improving the purity of the hydrogen generated by the electrochemical cell 14*a*. The adjustments enable the electrochemical cell 14*a* to provide a higher rate of refined hydrogen, a higher hydrogen purity, or refined hydrogen at a different pressure.

In one example, hydrogen communicating along the path 34*a* moves through a dryer (not shown), which dries the hydrogen prior to its entry into the electric power generator 18*a*. Drying the hydrogen ensures that the hydrogen entering the electric power generator 18*a* has a very low dew point, for example.

Figure 3:
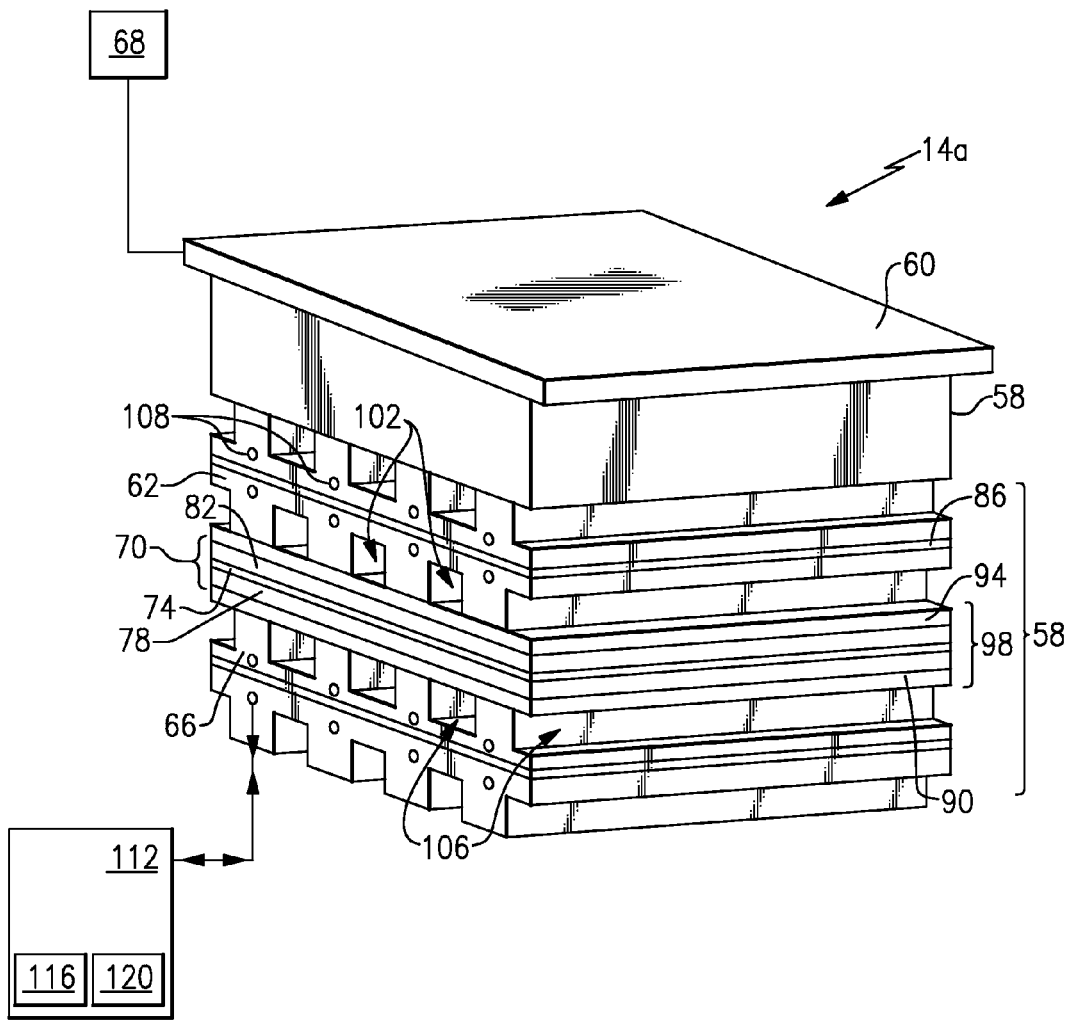
FIG. 3 shows a detailed schematic view of the FIG. 2 electrochemical cell.

Referring now to FIG. 3 within continuing reference to FIG. 2, the example electrochemical cell 14*a* includes multiple individual cells 58 arranged in a stack. Each cell 58 includes an anode plate 62 and a cathode plate 66 on opposing sides of a membrane electrode assembly 70. The electrochemical cell 14*a* receives electrical power from a power supply 68 to the end plates 60 (only one shown) of the electrochemical cell 14*a*.

In each of the example cells 58, the anode plate 62 and cathode plate 66 are porous structures that are filled with water and permit water to be transported through the plates, but act as barriers to gas transport through the plates. The membrane electrode assembly 70 includes a polymer electrolyte membrane 74 positioned between catalyst layers 78 and 82.

The example individual cell 58 has an optional solid separator plate 86 between the anode plate 62 and the cathode plate 66. The solid plate 86 may be a separate element or it may be an integral part of either anode plate 62 or cathode plate 66. The individual cells 58 may also include a cooler plate (not shown).

A cathode side diffusion layer 90 is arranged between the cathode plate 66 and the membrane electrode assembly 70. An anode side gas diffusion layer 94 is arranged between the anode plate 62 and the membrane electrode assembly 70.

In this example, a unitized electrode assembly 98 of the cell 58 comprises the cathode side gas diffusion layer 94, the anode side gas diffusion layer 90, and the membrane electrode assembly 70.

The flow of fluid is provided to the electrochemical cell 14*a* and moves through anode channels 102. The gas diffusion layer 94 distributes some of the flow of fluid from the anode channels 102 to the catalyst layer 82. In this example, the fluid moving along the path 22*a* provides the fluid that is distributed to the catalyst layer 82.

Within the cell 58, hydrogen (from the path 22*a*) is electrochemically oxidized to protons at the catalyst layer 82 nearest the anode plate 62 and the electrons flow through the anode plate 62. The protons are transported through the membrane 74 and are then electrochemically recombined with other protons and electrons provided by the cathode plate 66 to generate hydrogen gas at the catalyst layer 78 nearest the cathode plate 66. The electrons from the cathode plate 66 are provided by either the anode plate immediately adjacent or by the power supply 68 (for the cathode end cell, not shown). As can be appreciated, the evolving hydrogen is more concentrated, or refined, than the hydrogen communicated along the path 22*a*. The evolving hydrogen is communicated away from the electrochemical cell 14a through a plurality of channels 106.

In the middle of the plates 62 and 66 are coolant channels 108 that communicate water through the cell assemblies. These coolant channels 108 can either be part of the anode plate 62, the cathode plate 66, or both. They can also be established in the optional solid separator plate 86.

Again, in this example, both the anode plate 62 and the cathode plate 66 operate as water transport plates, which are porous structures that permit water to be transported through the plates but act as a barrier to gas since the plates are kept filled by water flowing in the coolant channels 108. In this example, the water flowing in the coolant channels 108 is maintained at a pressure that is slightly lower than the pressure of the gases in anode channels 102 and cathode channels 106. This ensures that any excess liquid water in the gases in these channels is drawn into the porous plates. At the same time, if these gases are not fully saturated with water vapor then the porous plates provide a means to saturate these gases by transporting water vapor into the gases by diffusion. The saturated gases in the channels 102 and 106 prevent the membrane 74 from drying out and this results in a membrane that has the lowest possible resistance to proton transport, as well as maximizing the membrane lifetime.

In this example, the water flowing through the channels 108 is provided by a coolant loop 112 external to the cell assembly 14a. This example coolant loop 112 has a pump 116 to provide both the flow and pressure desired and may also include a heat exchanger 120 to help maintain the cell temperature desired since some heat is generated by the cells. Alternatively, this coolant heat exchanger may be larger to also remove thermal energy from the incoming fluid 22a, if desired. (In other words, the electrochemical hydrogen pump may be used to provide hydrogen of the desired purity, pressure, and temperature required by using this coolant loop to as a means to remove both the thermal energy of the cells and the electric power generator.)

Other examples (not shown) may include only the anode plate 62 or the cathode plate 66 operating as porous water transport plates with the other plate being a solid plate. For example, a preferred configuration may be only the anode plate 62 is porous and the cathode plate 66 is solid. In this case, the coolant channels 108 should be in communication with the anode plate 62, by either being part of the anode plate 62 (as shown) or being on the back of the anode plate 62 or being contained in a solid plate (either 66 or 86) with the channels on the side adjacent to the porous anode plate 62. This configuration will ensure that the gas on the anode side is kept well saturated, which is especially important because the protons generated on the anode 82 will drag water as they are transported through the membrane 74 and will therefore keep the membrane well hydrated. It is not as critical to have a water source on the cathode side of the cell where hydrogen is generated. An additional advantage of this configuration is that there is a solid barrier between the anode channels 102 and the cathode channels 106, which may allow for a larger pressure difference between these two gas streams and enable hydrogen gas to be generated at higher pressures than a cell with all water transport plates.

Another example (not shown) may include having no separate coolant channels 108 and instead water is circulated through the cathode plate channels 106. In this case, hydrogen will be evolved into the circulating liquid water. In this case, the anode plate 62 and the cathode plate 66 can be either porous water transport plates or solid plates. This cell configuration is simple and should keep the membrane 74 well hydrated; however, a liquid-gas separator is then required downstream of the cell assembly 14a (on path 34a in FIG. 2) in order to separate the pure hydrogen from the liquid water stream. Dryers (not shown) will also be required to ensure that the hydrogen delivered to the electric power generator 18a is sufficiently dry.

Features of the disclosed examples include an electric power generator, or another hydrogen cooled device, having improved efficiencies over previous designs due to cooling utilizing hydrogen having an appropriate pressure and purity. The amount of hydrogen required is reduced and emissions from the electric power generator are also reduced as no excess hydrogen is provided.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. An electric power generator cooling method, the method comprising:
   introducing a fluid stream containing gaseous hydrogen and impurities into an electrochemical cell comprising a polymer electrolyte membrane through which hydrogen ions are transported, an anode plate having anode channels and a cathode plate having cathode channels, wherein at least one the anode plate and the cathode plate include coolant channels connected to a coolant loop, wherein the polymer electrolyte membrane is hydrated through the coolant channels;
   maintaining a pressure of coolant in the coolant channels at a lower pressure than a pressure of a gas in either of the anode channels or the cathode channels;
   providing a refined supply of hydrogen from the fluid stream introduced into the electrochemical cell by using the electrochemical cell to remove the impurities and provide the refined supply of hydrogen in a more refined state than the fluid stream introduced into the electrochemical cell;
   communicating the refined supply of hydrogen to an electric power generator;
   moving the refined supply of hydrogen through the electric power generator whereby thermal energy is removed from the electric power generator via direct contact of the refined supply of hydrogen with the electric power generator and whereby impurities are introduced into the refined supply of hydrogen;
   communicating the fluid stream containing gaseous hydrogen and impurities directly from the electric power generator to the electrochemical cell and purifying hydrogen within the fluid stream using the electrochemical cell to provide the refined supply of hydrogen; and
   venting the impurities.

2. The electric power generator cooling method of claim 1, including storing the refined supply of hydrogen before moving the refined supply of hydrogen through the electric power generator to remove thermal energy from the electric power generator.

3. The electric power generator cooling method of claim 1 wherein the coolant in the coolant channels is water flowing near the polymer electrolyte membrane.

4. The electric power generator cooling method of claim 1 further comprising:

communicating a first portion of thermal energy away from the electric power generator, the communicating including exhausting the first portion of thermal energy via a line directly connected to the electric power generator; and communicating a second portion of thermal energy away from the electric power generator to the electrochemical cell.

5. The electric power generator cooling method of claim 4 wherein communicating the second portion of thermal energy includes communicating the second portion of thermal energy to a heat exchanger in fluid communication with the electrochemical cell.

6. An electric power generator cooling method, the method comprising:

routing a stream of hydrogen gas with impurities entrained therein from an electric power generator to an electrochemical hydrogen pump having a polymer electrolyte membrane through which hydrogen ions are transported and having plates with coolant channels through which the polymer electrolyte membrane is hydrated, the coolant channels connected to a coolant loop, wherein pressure of water flowing in the coolant channels is maintained at a lower pressure than pressure of gas in anode and cathode channels of the electrochemical hydrogen pump;

operating the electrochemical hydrogen pump to remove the impurities and to generate a refined stream of hydrogen gas in a more refined state than the stream of hydrogen gas with impurities routed to the electrochemical hydrogen pump;

routing the refined stream of hydrogen gas from the electrochemical hydrogen pump through the electric power generator whereby thermal energy is removed from the electric power generator via direct contact of the refined stream of hydrogen gas with the electric power generator and whereby impurities are introduced into the refined stream of hydrogen gas to generate the stream of hydrogen gas with impurities to be routed to the electrochemical hydrogen pump to be refined;

monitoring at least one of purity, temperature, and pressure of the refined stream of hydrogen gas in the electric power generator with a hydrogen control system in communication with the electric power generator and having a controller in communication with the electrochemical hydrogen pump and the electric power generator; and adjusting via the electrochemical hydrogen pump a corresponding at least one of purity, temperature, and pressure of the refined stream of hydrogen gas in the electric power generator based at least in part on the monitoring.

7. The electric power generator cooling method of claim 6, further comprising: storing the refined stream of hydrogen gas before routing the refined stream of hydrogen gas through the electric power generator to remove thermal energy from the electric power generator.

8. The electric power generator cooling method of claim 6, wherein adjusting the at least one of purity, temperature and pressure of the refined stream of hydrogen gas based at least in part on said monitoring includes at least one of the following:

increasing the stream of hydrogen gas routed to the electrochemical hydrogen pump to be refined;

increasing a generation rate of the refined stream of hydrogen gas generated by the electrochemical hydrogen pump;

increasing the pressure of the refined stream of hydrogen gas generated by the electrochemical hydrogen pump; and increasing the purity of the refined stream of hydrogen gas generated by the electrochemical hydrogen pump.

9. An electric power generator cooling method, the method comprising:

routing a stream of hydrogen gas with impurities entrained therein directly from an electric power generator to an electrochemical cell, the electrochemical cell having a polymer electrolyte membrane, first and second catalyst layers adjacent opposing sides of the polymer electrolyte membrane, an anode plate adjacent the first catalyst layer and having anode channels, and a cathode plate adjacent the second catalyst layer and having cathode channels, wherein at least one of the anode plate and cathode plate includes coolant channels;

hydrating the polymer electrolyte membrane via the anode or cathode plate via a coolant loop in fluid communication with the coolant channels;

maintaining a pressure of water flowing in the coolant channels at a lower pressure than a pressure of a gas in either of the anode channels or cathode channels;

operating the electrochemical cell to remove the impurities and to generate a refined stream of hydrogen gas in a more refined state than the stream of hydrogen gas with impurities routed to the electrochemical cell, wherein operating the electrochemical cell to remove the impurities includes venting the impurities via a vent directly connected to the electrochemical cell;

routing the refined stream of hydrogen gas from the electrochemical cell through the electric power generator whereby thermal energy is removed from the electric power generator via direct contact of the refined stream of hydrogen gas with the electric power generator and whereby impurities are introduced into the refined stream of hydrogen gas to generate the stream of hydrogen gas with impurities to be routed directly to the electrochemical hydrogen pump to be refined;

monitoring at least one of purity, temperature, and pressure of the refined stream of hydrogen gas in the electric power generator with a hydrogen control system; and adjusting a corresponding at least one of purity, temperature, and pressure of the refined stream of hydrogen gas in the electric power generator based at least in part on the monitoring.

10. The electric power generator cooling method of claim 9, further comprising, regulating flow and pressure of water within the coolant channels and a heat exchanger in fluid communication with the coolant channels via a pump of the coolant loop.

11. The electric power generator cooling method of claim 10 wherein routing the stream of hydrogen gas with impurities entrained therein directly from the electric power generator to the electrochemical cell includes communicating thermal energy away from the electrochemical cell to the heat exchanger.

* * * * *